United States Patent [19]

Veale

[11] Patent Number: 4,490,944

[45] Date of Patent: Jan. 1, 1985

[54] PRESSURE-COMPENSATED HYDRAULIC POSITIONING SYSTEM

[75] Inventor: John P. Veale, Lake Stevens, Wash.

[73] Assignee: Western Gear Machinery Co., Everett, Wash.

[21] Appl. No.: 455,212

[22] Filed: Jan. 3, 1983

[51] Int. Cl.³ .......................... B24B 49/00; B24B 7/02
[52] U.S. Cl. ........................................... 51/35; 51/45;
51/165.71; 51/165.9
[58] Field of Search ................ 51/34 R, 34 A, 35, 45,
51/165.77, 165.71, 165.92, 165.9, 165.91;
364/474

[56] References Cited

U.S. PATENT DOCUMENTS

| | | | |
|---|---|---|---|
| 2,726,490 | 12/1955 | Lowe | 51/45 |
| 3,354,587 | 11/1967 | Janis, Jr. et al. | 51/35 |
| 3,667,165 | 6/1972 | McDowell et al. | 51/165.77 |
| 3,721,045 | 3/1973 | Wojcik | 51/165.9 |
| 4,100,700 | 7/1978 | Pierce et al. | 51/165.71 |
| 4,248,019 | 2/1981 | Howley et al. | 51/35 |

*Primary Examiner*—Frederick R. Schmidt
*Assistant Examiner*—Robert A. Rose
*Attorney, Agent, or Firm*—Seed and Berry

[57] ABSTRACT

A conditioner grinder having a workpiece carried by a car that reciprocates adjacent a grinding wheel. The grinding wheel is supported for movement in a direction both normal to the surface to be ground and transversely across the surface to be ground. Movement of the grinding wheel in both of these directions is through conventional hydraulic actuators. The hydraulic actuator indexing the grinding wheel transversely across the workpiece contains a pair of pressure sensors that measure the differential pressure across the piston of the actuator. The differential pressure signal is subtracted from a position error indicative of the difference between the actual position of the grinding wheel and the desired transverse position of the grinding wheel. In the event that the position error exceeds a predetermined value, a pressure command added to the position error increases or decreases linearly with time toward the position error, thereby providing a steady-state error signal to cancel the signal resulting from a differential pressure across the piston under steady-state conditions.

21 Claims, 4 Drawing Figures

PRESSURE-COMPENSATED HYDRAULIC POSITIONING SYSTEM

DESCRIPTION

1. Technical Field

This invention relates to hydraulic positioning systems, and more particularly, to a system for controlling the position of a grinding wheel across the surface of a workpiece.

2. Background Art

The need exists in a large number of fields to perform grinding operations on workpieces. For example, a billet is often the raw material for a rolling process in which the billet is flattened and formed into a finished product. These billets often contain surface imperfections which, if not removed, are carried through to the finished product. Accordingly, these imperfections are normally removed in grinding process called "spotting," in which a rotating grinding wheel is held against the surface imperfection until the surface imperfection is removed. The surfaces of billets are also normally coated with a layer of oxides and other material. This surface layer must also be removed in order to prevent the surface layer from degrading the quality of the finished product. The surface layer is normally removed in a process called "skinning," in which the billet reciprocates beneath the grinding wheel while the grinding wheel is held in contact with the billet. After each grinding pass, the grinding wheel is stepped or "indexed" transversely across the surface of the workpiece that is being skinned.

The skinning process is often performed automatically. In an automatic skinning operation, the grinding pressure of the wheel against the workpiece is automatically controlled while the workpiece reciprocates back and forth adjacent the grinding wheel, and the grinding wheel indexes across the workpiece an incremental distance each grinding pass.

During any grinding application, whether automatic or normal, skinning or spotting, the position of the grinding wheel is normally controlled by two hydraulic actuators of conventional design. Generally, one actuator primarily controls the force of the grinding wheel against the workpiece, while the other actuator "indexes" or moves the grinding wheel transversely across the workpiece an incremental distance each grinding pass. However, the indexing actuator may have some effect on the grinding force and the grinding force actuator may affect the transverse position of the grinding wheel.

A problem encountered in the use of hydraulic actuators to index the grinding wheel is the relatively slow response speed of the actuators. The actuators normally consist of a cylinder divided into two chambers by a piston. A rod extending from the piston is coupled to the grinding wheel to move the grinding wheel as fluid flows into and out of the chambers of the cylinder. Fluid flow into and out of the actuator is normally controlled by a servo valve having an electrical control input. The signal applied to the control input is normally derived from a comparison of the actual transverse position of the grinding wheel to the desired position of the grinding wheel. As the desired position of the grinding wheel rapidly changes, the signal applied to the control input of the servo valve changes accordingly. However, the response time of the control loop is generally slower than desired. The speed at which the automatic skinning procedure can be conducted is severely limited by a relatively slow indexing system, thus limiting the throughput of such conditioner grinders. The operating speed of the system can be increased only by increasing the loop again of the system, but this has a tendency to make the system unstable.

In order to increase the response speed of servo control systems in which the feedback signal is derived solely from a position signal, feedback signals indicative of the first derivative of the position with respect to time (i.e., the velocity) have been used. Feedback servo systems utilizing velocity or rate feedback result in "damping" of the system, thus allowing the gain of the position loop to be increased above what would otherwise be permissible. As a result, the response speed of the servo system is increased. However, even servo systems utilizing velocity feedback are fairly slow. Furthermore, systems utilizing velocity feedback are highly susceptible to instability produced by excessive phase shift in the servo systems. A phase shift 180° is not uncommon, thus causing negative velocity feedback to become positive feedback and result in instability. Thus, although velocity feedback may improve the performance of some position feedback servo systems, its advantages are nevertheless limited in general applications for indexing control systems.

DISCLOSURE OF THE INVENTION

It is an object of the invention to provide an indexing control system for a conditioner grinder that has a relatively fast response speed, thus maximizing the throughput of the grinder.

It is another object of the invention to provide an indexing control system for a conditioner grinder that is relatively stable despite variations in phase shifts resulting from mechanical delays inherent in conditioner grinders.

It is a further object of the invention to provide an index control system for a conditioner grinder which generates a control signal derived from a position error in a transient condition but derived from another source under steady-state conditions in order to allow a control signal to be geneated with a substantially zero steady-state position error.

These and other objects of the invention are provided by an indexing control system for a conditioner grinder. The transverse position of the grinding wheel is controlled by a conventional hydraulic actuator having a cylinder divided into two chambers by a piston coupled at least indirectly to the grinding wheel. A position signal indicative of the transverse position of the grinding wheel is compared to a position command to generate a position error signal. The position error signal is amplified and applied to a control signal generator which also receives a pressure feedback signal indicative of the differential pressure across the piston of the hydraulic actuator cylinder. The pressure feedback signal is subtracted from the position error signal so that the position error signal basically provides the control signal while the pressure feedback signal produces damping. The control signal is applied to a conventional servo valve that controls the flow of hydraulic fluid to the hydraulic actuator. In the steady-state condition (i.e., when the piston error is zero), it is sometimes necessary to apply a transverse force to the grinding wheel in order to maintain the grinding wheel stationary. For example, the workpiece will normally apply a transverse force to the grinding wheel which must be resisted if the position error is to be held at zero. This transverse force requires that a pressure differential be generated across the piston of the hydraulic actuator. A pressure error signal to generate this transverse force is provided by generating a pressure command that linearly changes in the polarity of the position error signal. The pressure error signal is then generated by comparing the pressure command to the differential pressure measured across the piston of the indexing actuator. The pressure command preferably changes only when the position error is above a predetermined threshold. The use of a pressure feedback signal stabilizes the system despite large variations in the phase shift of the system resulting from mechanical delays and despite a gain in the position control loop that would otherwise cause the system to oscillate.

BEST MODE FOR CARRYING OUT THE INVENTION

Figure 1:
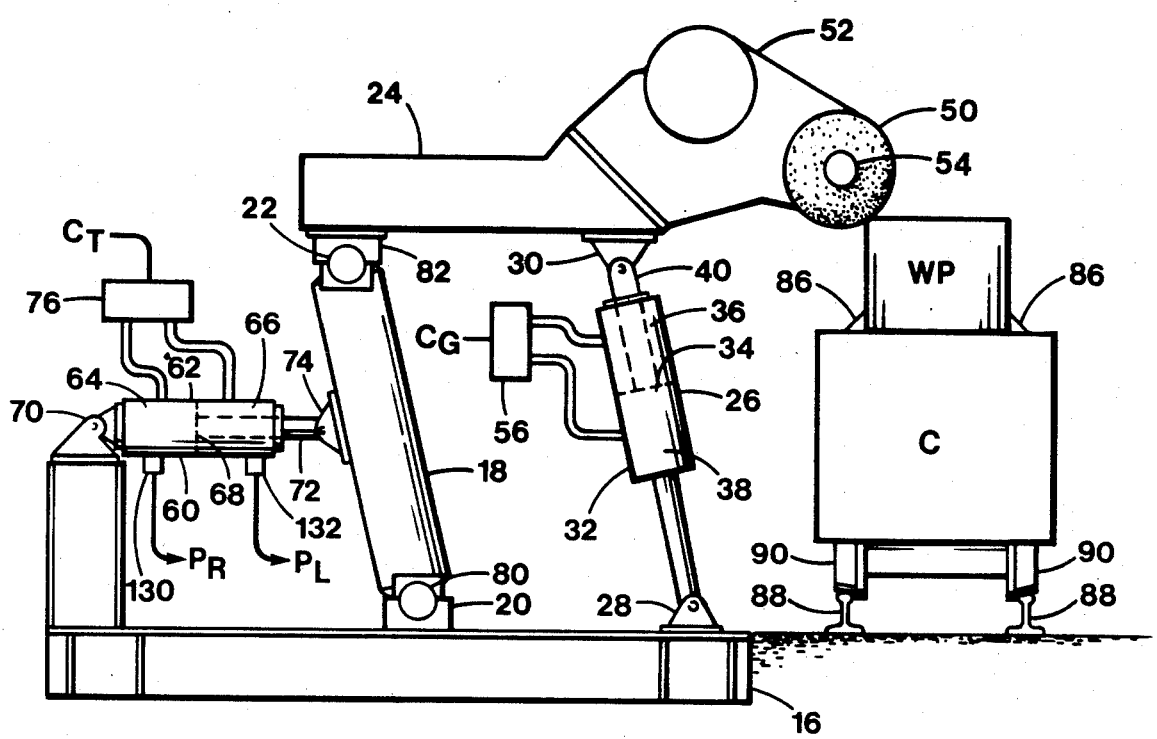
FIG. 1 is an end elevational view in schematic form of a typical apparatus for grinding a workpiece such as a billet.
Figure 2:
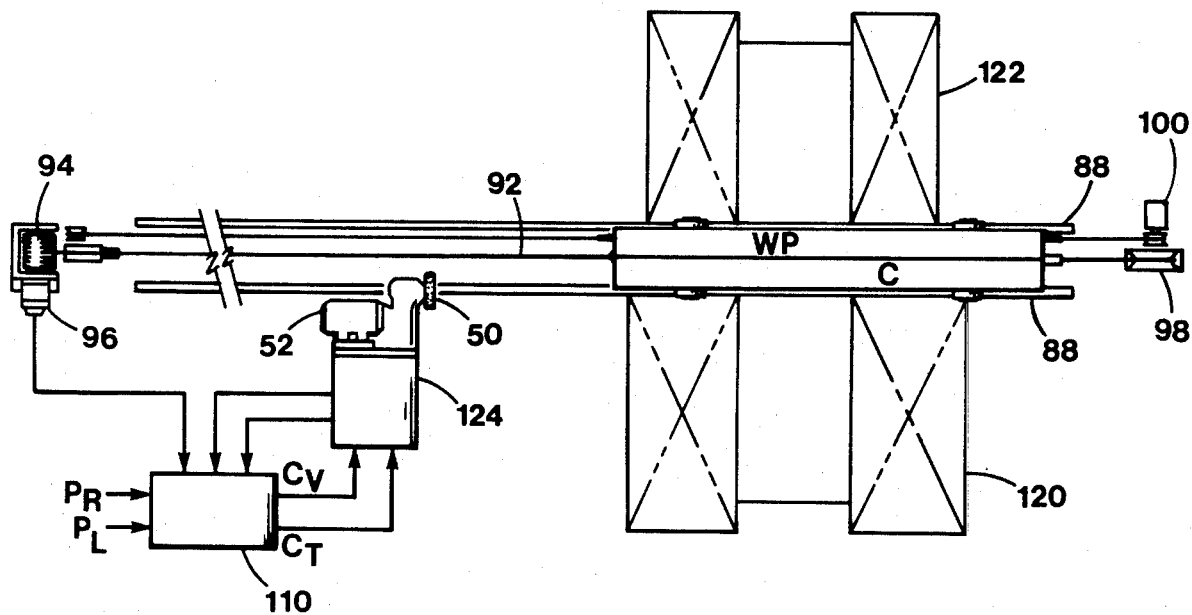
FIG. 2 is a top plan view of the grinding apparatus of FIG. 1.

A typical apparatus for grinding workpieces, such as billets, is illustrated in FIGS. 1 and 2. With reference to FIG. 1, the apparatus includes a stationary, rigid floor frame 16, from which a support 18 is pivotally mounted at 20. The opposite end of the pivotal support 18 is pivotally secured at 22 to a horizontally disposed grinding wheel support arm 24. A conventional hydraulic actuator 26 is also pivotally mounted to the floor frame 16 at 28 and to the grinding wheel support arm 24 at 30. The actuator 26 includes a cylinder 32 containing a piston 34 that divides the cylinder 32 into two chambers 36 and 38. The piston 34 is directly or indirectly coupled to the support arm 24, such as by a rod 40.

Although the distance between the pivotal connections 28,30 is varied by the actuator 26, the adjustment is relatively slight so that the pivotal support 18 and hydraulic actuator 26 somewhat approximate a parallelogram. A grinding wheel 50 mounted on a motor 52 through a spindle 54 is carried at the end of the horizontally disposed grinding wheel support arm 24. Hydraulic fluid flowing into and out of the hydraulic actuator 26 in a conventional manner acts primarily in the vertical direction so that it primarily controls grinding force, as described below. However, it will be apparent that the actuator 26 also moves the support arm 24 transversely to a slight degree. The flow of hydraulic fluid into and out of the actuator 26 is controlled by a conventional servo valve 56 receiving a control signal $C_G$. The system for generating the control signal $C_G$ to control the grinding force does not form a part of this invention, but is described in the prior art, such as in U.S. Pat. No. 4,248,019.

The structure of the support 18 and hydraulic actuator 26 cause a second hydraulic actuator 60 to produce primarily transverse movement of the grinding wheel 50. Like the actuator 26, the actuator 60 includes a cylinder 62 divided into two chambers 64,66 by a piston 68. The cylinder 62 is pivotally connected to the floor frame 16 at 70, and a rod 72 projects from the piston 68 and is pivotally connected to the pivotal support 18 at 74. It will be understood, however, that the actuator 60 could be connected to the support 18 either directly or indirectly through a variety of coupling elements. Fluid flow into and out of the actuator 60 is controlled by a conventional servo valve 76 in accordance with a control signal $C_T$.

The rotational positions of the pivotal support 18 with respect to the frame 16 and the support arm 24 are sensed by conventional rotary encoders 80,82, respectively. These encoders 80,82 allow the position of the grinding wheels 50 to be constantly determined as the actuators 26,60 vary the positions of the pivotal support 18 and support arm 24.

During grinding, the workpiece WP is carried by a manipulator car C and is securely held thereon by clamp members 86. The car C is supported on rails 88 by a pair of wheel 90. The car C, and hence the workpiece WP, reciprocate beneath the grinding wheel 50 as the car C moves along the rails 88. As illustrated in further detail in FIG. 2, a cable 92 connected to one end of the carriage C engages a drum 94 which is rotated by a hydraulic motor 96 in accordance with a control signal generated in a conventional manner. The cable 92 extends beneath the rails 88 and engages a freely rotating sheave 98 at the other end of the rails 88. Thus, rotation of the drum 94 moves the carriage C along the rails 88. The position of the car C and, hence, the workpiece WP with respect to the grinding wheel 50 may be measured by a rotary encoder 100 rotating with the drum.

The grinding system as described above is conventional and is described in greater detail in U.S. Pat. No. 4,248,019, which is incorporated herein by reference. The output of the encoder 100, as well as the outputs of the encoders 80,82 (FIG. 1) for sensing the position of the grinding wheel 50, are applied to a conventional computer 110 operating under a program of instructions described in detail below. The sensors 80,82,100 are preferably encoders which generate a byte of digital data indicative of the respective sensed operating parameter. However, the sensors 80,82,100 may alternatively generate an analog output, in which case the computer 110 contains an internal analog-to-digital converter implemented in a conventional manner. The computer 110 generates the control outputs $C_G, C_T$ to the servo valves 56,76, respectively.

In normal operation, a workpiece WP, such as a billet, is initially placed on a conventional charge table 120. The carriage C is then moved along the rails 88 and the workpiece WP is loaded onto the carriage C by conventional handling means. The carriage C then moves toward a position beneath the grinding wheel 50 and the grinding wheel 50 is lowered into contact with one of the exposed surfaces of the workpiece WP. The workpiece WP then reciprocates back and forth beneath the grinding wheel 50.

The hydraulic actuator 26 is primarily energized to control the force exerted by the grinding wheel 50 against the vertical surface of the workpiece WP. The hydraulic actuator 60 is energized primarily to step or "index" the grinding wheel transversely across the surface to be ground an incremental distance after each grinding pass. In the event that the grinding wheel 50 is being used to grind the side surface of the workpiece WP, the actuators 26,60 will reverse roles, with the actuator 60 controlling the grinding force and the actuator 26 indexing the grinding wheel 50 across the surface to be ground. After the surface of the workpiece WP has been ground, the workpiece WP is turned over to expose the remaining surfaces of the workpiece WP to the grinding wheel 50.

After grinding, the carriage C is moved along the rails 88 to a discharge position, where the workpiece WP is loaded onto a conventional discharge table 122 by conventional handling means. The entire operation of the system is controlled in a conventional manner, either manually or semiautomatically, by an operator in a cab 124, as is well known to those skilled in the art. One such workpiece grinding system is disclosed in previously mentioned U.S. Pat. No. 4,248,019.

The above-described grinding apparatus is one design used to grind elongated workpieces, such as billets. However, other types of grinding apparatus are also used to perform grinding operations on workpieces of various types. Thus, although the inventive control system is described below with reference to the grinding apparatus of FIGS. 1 and 2, it will be understood that the inventive control system can also be used with other grinding apparatus.

In conventional conditioning grinders, the grinding wheel is indexed transversely across the surface to be ground by measuring the actual transverse position of the grinding wheel and then comparing the actual transverse position to a position command indicative of the desired transverse position. The desired transverse position is normally stepped after each grinding wheel. A position error signal that is proportional to the difference between the actual transverse position to the position command is amplified and applied to a servo valve, such as the servo valve 76 of FIG. 1. The primary disadvantage of an index control system of this type is its relatively slow response. This slow response results primarily because the position error signal from which the correcting control signal is generated gets smaller and smaller as the actual transverse position of the grinding wheel approaches the desired transverse position. The response speed of such position servo systems could be increased by increasing the loop gain (i.e., the total gain around the entire servo loop), but such servo systems become unstable as the loop gain is increased, primarily because of phase shifts produced by mechanical delays inherent in the massive nature of the grinding apparatus.

Attempts have been made to stabilize indexing servo systems for conditioner grinders so that the loop gain can be increased to allow faster response times. One approach has been to derive a negative feedback signal indicative of the transverse rate of movement of velocity of the grinding wheel. This velocity or rate feedback ideally dampens the response of the servo loop, thus allowing higher gain and consequential increased response speeds. However, positive rate or velocity feedback had to be used to stabilize the indexing servo systems and even then would not consistently stabilize the system from one machine to another. Furthermore, systems utilizing rate feedback are very susceptible to variations in phase shifts resulting from mechanical delays which, in actual testing, did result in positive velocity feedback and consequential oscillation.

The problem resulting from a relatively slow indexing system is most severe during an automatic grinding process when the manipulator car C reverses direction at each end of the workpiece WP. With a relatively slow index system, patches of unground material on the workpiece are left because the manipulator car does not remain stationary as the indexing occurs. With a faster indexing, these patches are greatly reduced with a given manipulator car speed, and adequate grinding quality can be maintained at a substantially faster car speed. Operating the manipulator car at a higher speed allows faster grinding passes, thus increasing the throughput of the conditioner grinder.

Figure 3:
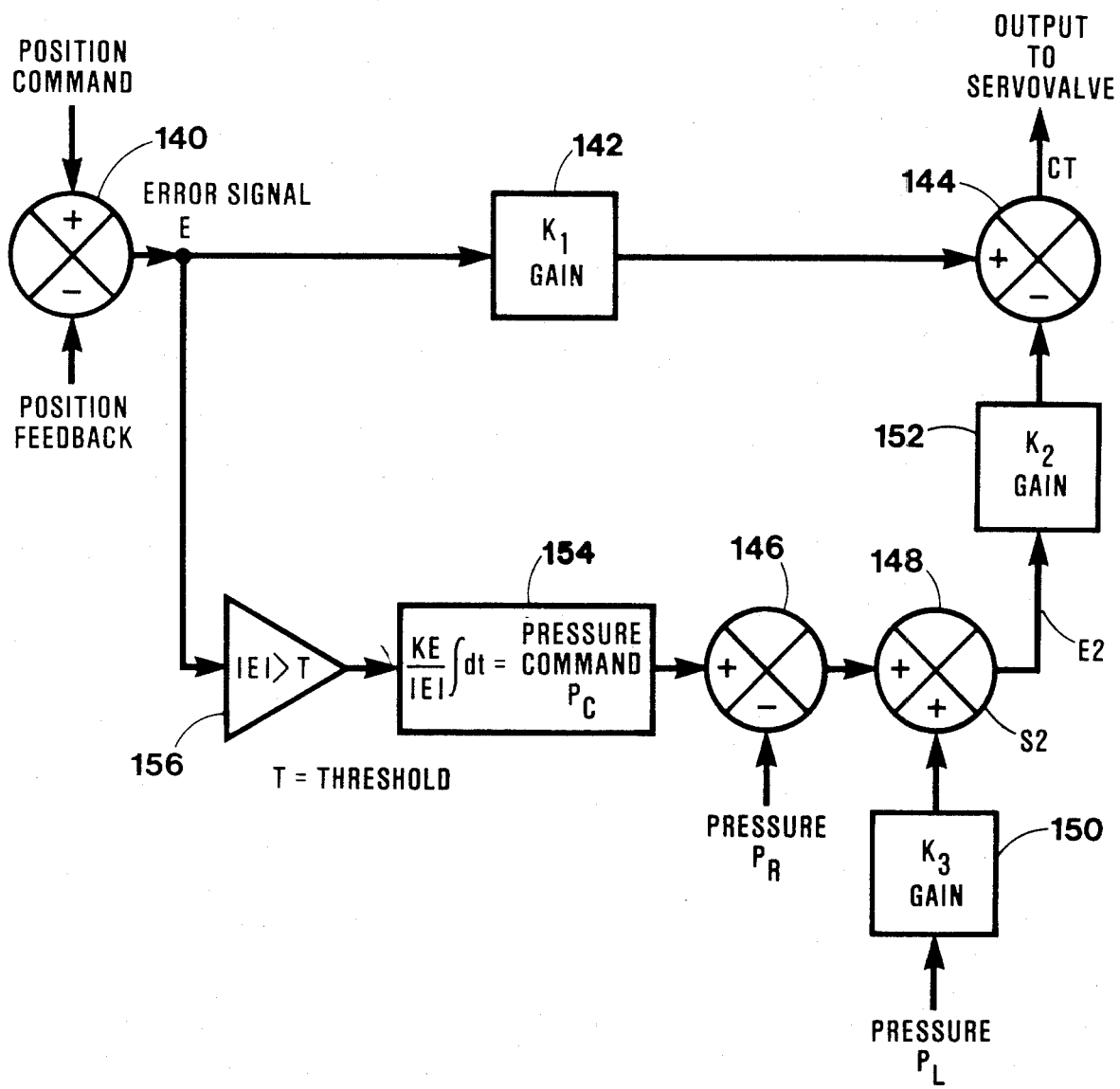
FIG. 3 is a block diagram of the index control system for the conditioning grinder of FIGS. 1 and 2.

Problems encountered with conventional indexing systems, some of which are described above, can be largely solved by utilizing the inventive indexing system. Accordingly, with reference to FIG. 1, the pressure in each chamber 66,64 of the indexing actuator 60 is measured by a conventional pressure sensor 130,132. The sensors 130,132 generate respective pressure feedback signals $P_R, P_L$ that are applied to the computer 110 (FIG. 2) to allow the computer 110 to calculate the pressure differential across the piston 68. This pressure differential is used as a negative feedback signal in the indexing servo loop, as explained in greater detail below. With reference to FIG. 3, a position command indicative of the desired transverse position of the grinding wheels 50 is generated in a conventional manner. The position command is compared to the actual transverse position of the grinding wheel 50 to generate an error signal E. The position feedback signal is derived primarily from the position sensor 80 in accordance with known trigometric principles utilized by the computer 110. The position error signal is amplified at 142 with a gain $K_1$ and applied to the servo valve 76 through a conventional summing device 144. The servo system, as described to this point, is a conventional position servo loop which, as indicated above, is relatively slow. However, in the inventive indexing system, the grain $K_1$ provided at 142 is sufficiently high that the system would oscillate but for the pressure feedback described below. This relatively high gain provides the system with relatively high response speeds.

The pressure feedback is derived from the pressure sensors 130,132 (FIG. 1). The pressure feedback signal $P_R$ is applied to the subtraction input of a conventional summing device 146 having its output, in turn, connected to the adding input of a second summing device 148. The subtracting input of the summing device 148 receives the pressure feedback signal $P_L$ after it has been boosted by an amplifier 150 that provides a gain $K_3$. The output of the summing device 148 is essentially $P_C - P_R$ minus $K_3 P_L$. The gain $K_3$ is provided to compensate for the area of the piston 68 (FIG. 1) occupied by the piston rod 72. The force exerted to the right in FIG. 1 is essentially $P_R A$, where $R_R$ is the pressure in the chamber 64 and A is the surface area of the piston 68. The force exerted to the left is essentially $P_L$ times the surface area of the piston 68 exposed to the fluid in the chamber 66. The surface area exposed to the fluid in the chamber 66 is, of necessity, smaller than the surface area on the opposite side of the piston 68 because of the surface area of the piston 68 occupied by the rod 72. The gain $K_3$ has a magnitude proportional to the ratio of the area of piston 68 exposed to the fluid in chamber 64 to the area of piston 68 exposed to the fluid in the chamber 66. The output of the summing device 148 is thus a true measure of the force exerted by the piston 68. This signal is applied to an amplifier 152 having a gain $K_2$ and then subtracted from the amplified position error signal $K_1 E$ in the summing device 144. Although the particular mathematical parameters $K_1, K_2, K_3$ will vary depending upon the specific application, it can be intuitively seen that the pressure feedback provides damping of the indexing system. The large gain $K_1$ causes a relatively small error signal to generate a substantially larger control signal $C_T$. The large control signal $C_T$ causes the pressure differential across the piston 68 to increase quite rapidly, thereby causing the transverse velocity of the grinding wheel 50 to also increase rapidly. Without damping, the grinding wheel 50 would overshoot the desired transverse position and then, upon reversing direction, could easily once again overshoot the desired position. The pressure feedback signal reduces the control voltage $C_T$ under the circumstances described above to prevent excessive overshooting and oscillation.

Returning now to FIG. 1, it will be seen that the pivotal support 18 extends upwardly to the left. As a result, a force is exerted on the actuator 60 by the pivotal support 18 that must be counteracted by the actuator 60 in steady-state conditions in which no transverse movement of the grinding wheel 60 is desired because the position error is zero. The transverse force of the support 18 on the actuator 60 results in a pressure differential across the piston 68, thereby causing amplifier 152 to output to a pressure feedback signal. Under steady-state conditions, the control signal $C_T$ should be zero. However, the pressure feedback signal from amplifier 152 can be offset only by a position error signal from amplifier 142. Thus, under steady-state conditions, a position error would be required to resist the force exerted on the actuator 60 by the grinding wheel support mechanism.

In order to allow the actuator 60 to withstand forces without requiring a position error signal, a pressure command generator 154 (FIG. 3) is used to cancel out the pressure feedback signal under steady-state conditions. Basically, the pressure command generator 154 integrates a constant value having a polarity equal to that of the error signal. Thus, for a positive error signal, the pressure command generated at 154 increases linearly. A negative position error causes the pressure command output by the pressure command generator 154 to decrease linearly.

In order to prevent the pressure command generator 154 from continuously either increasing or decreasing for small positive or negative error signals, a conventional comparator 156 prevents the pressure command from changing unless the absolute value of the position error exceeds a predetermined value. As a result, the actuator 60 is able to resist transverse forces while permitting only a relatively small position error signal. When the error signal increases above the threshold set by comparator 156, the output of the pressure command generator 154 increases or decreases toward the position error, thus allowing a zero control signal $C_T$ to be produced with a smaller position error. For example, assuming that a force exerted on the piston 68 results in a pressure differential $P_R$ minus $K_3 P_L$ of 6 volts (and assume $K_2$ is 1), an amplified error signal $K_1 E$ must be produced in order to produce a zero control signal $C_T$. If the control signal $C_T$ is not zero, the grinding wheel 50 will move transversely and the system will not be in steady-state conditions. If the threshold set by the amplifier 156 is 1 volt, the pressure command output by the pressure command generator 154 will increase an additional 5 volts so that the differential pressure signal applied to the summing device 144 will now be 1 volt, which will be offset by a relatively small position error since $K_1 E$ now need only be 1 volt to produce a zero control signal $C_T$. Although use of the pressure command generator 154 is desirable to reduce the position error under steady-state conditions, it is not mandatory since pressure feedback alone will vastly improve conventional indexing systems for conditioner grinders. Similarly, although the output of the pressure command generator 154 preferably does not change until the absolute value of the position error exceeds a predetermined threshold, the output of the pressure command generator 154 can instead continuously either increase or decrease toward the position error.

Figure 4:
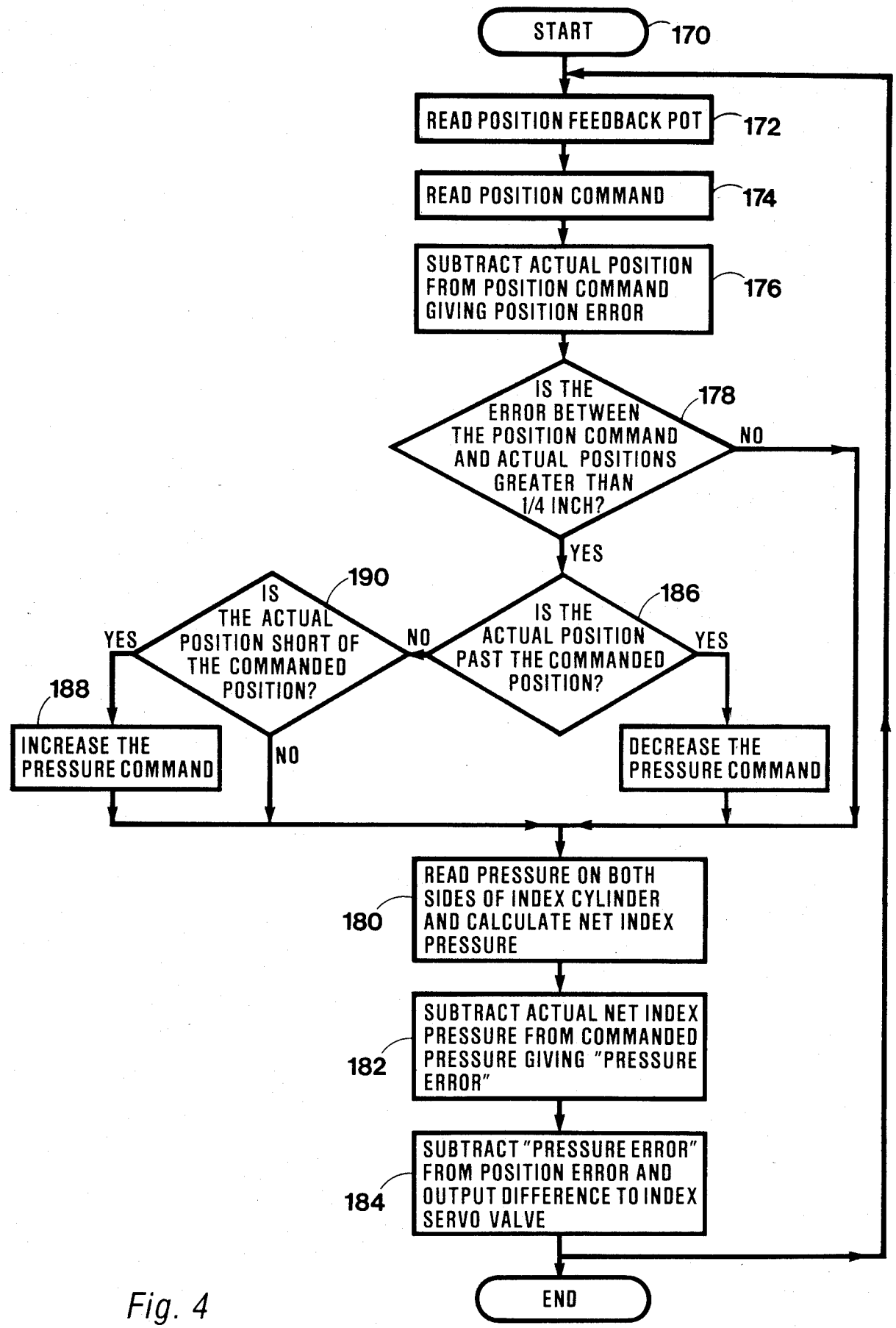
FIG. 4 is a flow chart of the software for implementing one embodiment of the index control system of FIG. 3.

The inventive indexing control system illustrated in FIG. 3 can be implemented through a variety of devices, both analog and digital, well known to one skilled in the art. In the event that a digital computer 110 of conventional design is used, a program of instructions may be used according to the flow chart illustrated in FIG. 4. The program is entered at 170 and the output of the position sensor 80 is read at 172. The position command indicative of the desired transverse position of the grinding wheel 50 is then read at 174. The actual transverse position of the grinding wheel 50 is calculated at 176 and then subtracted from the position command to determine a position error E (FIG. 3). The summing device 140 (FIG. 3) and the gain 142 are thus implemented at 176. The program then proceeds to 178, where the absolute value of the position error is compared to a threshold of 0.25 inch. Assuming that the pressure error is less than 0.25 inch, the program proceeds directly to 180, where the pressure feedback signals $P_R, P_L$ are read from the sensors 130, 132, respectively, and the differential pressure across the piston 68 is calculated taking into account the effect of the piston rod 72 on the calculation of force from differential pressure. The differential pressure or "net index pressure" is then subtracted at 182 from any pressure command output by the pressure command generator 154. The pressure error E2 is then subtracted from the position error at 184 to produce the control signal $C_T$ that is output to the servo valve 76 (FIG. 1). The program then returns to 172, where the transverse position of the grinding wheel 60 is once again determined.

The foregoing has assumed that the position error calculated at 176 is less than the 0.25 threshold. If the position error is greater than 0.25 inch, the program proceeds to 186, where it determines whether the actual transverse position of the grinding wheel 60 is larger than the commanded position, thus producing a negative error. If so, the command pressure is linearly reduced at 188. If the actual position is determined at 186 to not be greater than the commanded position, the program proceeds to 190, where the actual position of the grinding wheel 50 is once again compared to the commanded position. The actual position should, by a process of elimination, now be smaller than the commanded position, thus resulting in a positive error. As a result, the pressure command increases linearly with time. As explained below, the "net index pressure," indicative of the differential pressure across the piston 68, is subtracted from this pressure command at 182, and the result is subtracted from the position error at 184.

I claim:

1. A system for controlling the transverse position of a grinding wheel across a workpiece surface in accordance with a position command signal corresponding to a desired transverse position of said grinding wheel, said grinding wheel being moved in said transverse direction by a hydraulic actuator having a cylinder divided into first and second chambers by a piston coupled at least indirectly to said grinding wheel, said system comprising:
  a position sensor measuring the transverse position of said grinding wheel and generating a position signal indicative thereof;
  an error signal generator producing a position error signal indicative of the deviation of said position signal from said position command signal;
  first and second pressure sensors operatively associated with said hydraulic actuator, said pressure sensors generating pressure feedback signals indicative of the pressure in the first and second chambers of said actuator;
  a control signal generator receiving a signal derived from said position error signal and a signal derived from said pressure feedback signals, said control signal generator including a calculating device that determines the difference between said pressure feedback signals to generate a force signal indicative of the force exerted by said actuator in the direction of said desired position and generates a control signal corresponding to said error signal less said force signal; and
  a servo valve having an electrical control input receiving said control signal, said servo valve having a fluid port communicating with at least one chamber of said actuator to cause hydraulic fluid to selectively flow into and out of said chambers responsive to said control signal, thereby transversely moving said grinding wheel.

2. The control system of claim 1 wherein said control signal generator further includes an integrator integrating a signal having the same polarity as said error signal to generate a pressure command signal, said pressure command signal being applied to said calculating device, said calculating device adding said pressure command signal to said error signal, thereby compensating for forces exerted on said actuator during steady-state conditions.

3. The control system of claim 2 wherein said integrator integrates only when enabled by an enable signal, said calculating device further including a threshold comparator having an output connected to said integrator and at least one input connected to said error signal generator to receive said error signal, said threshold comparator generating said enable signal at its output when the absolute value of the error signal applied to its input exceeds a predetermined value.

4. The control system of claim 1, further including an amplifier having an input connected to said error generator to receive said error signal, and an output connected to said control signal generator, said amplifier having sufficient gain to make said control system unstable but for said pressure feedback signals.

5. The control system of claim 1 wherein a rod extends from the piston of said actuator through one of said chambers, and wherein said system further includes an amplitude scaling device having an input connected to the output of one of said pressure sensors and an output connected to said control signal generator, said scaling device adjusting the amplitude of one pressure feedback signal to compensate for the area of said piston occupied by said rod.

6. The control system of claim 5 wherein said scaling device is an amplifier having its input connected to the output of said pressure sensor for the chamber through which said rod extends, said amplifier having a gain determined by the ratio of the cross-sectional area of said piston to the difference between the cross-sectional area of said piston and the cross-sectional area of said rod at the point where it connects to said piston.

7. The control system of claim 1 wherein the ratio of the force generated by said actuator to said position error signal is sufficiently large to make said system unstable without said first and second pressure indications.

8. A system for controlling a hydraulic actuator that indexes a grinding wheel transversely across a surface to be ground, said hydraulic actuator having a pair of chambers separated by a piston that moves responsive to differential fluid pressure in said chambers to control the transverse position of said grinding wheel, the flow of fluid into and out of said chambers being controlled by a valve in accordance with a control signal applied to a control input, said system comprising:
  command means generating a position command indicative of a desired transverse position of said grinding wheel;
  pressure sensing means generating first and second pressure indications corresponding to the fluid pressure in said first and second cylinders, respectively;
  position sensing means generating a position indication corresponding to the transverse position of said grinding wheel; and
  processing means generating as said control signal a signal corresponding to the difference between said position command and said position indication less the difference between said first and second pressure indications.

9. The control system of claim 8, further including pressure command generating means producing a pressure command that is added to the difference between said position command and said position indications, said pressure command corresponding to a value that increases linearly with time responsive to one polarity of difference between said position command and said position indication and that decreases linearly with time responsive to the opposite polarity of difference between said position command and said position indication.

10. The control system of claim 9 wherein said pressure command generating means further includes threshold means for preventing said pressure command from changing unless the absolute value of the difference between said pressure command and said position indication exceeds a predetermined value.

11. The control system of claim 8 wherein said pressure sensing means generate an analog signal indicative of the fluid pressure in said first and second chambers.

12. The control system of claim 8 wherein said position sensing means generate an analog signal indicative of the transverse position of said grinding wheel.

13. The control system of claim 8 wherein said pressure sensing means generate respective bytes of digital data indicative of the fluid pressure in said first and second chambers.

14. The control system of claim 8 wherein said position sensing means generate a byte of digital data indicative of the transverse position of said grinding wheel.

15. A conditioner grinder, comprising:

a grinding wheel mounted on a grinding wheel support;

a motor operatively coupled to said grinding wheel to rotate said grinding wheel;

a manipulator car supporting a workpiece;

a pair of hydraulic actuators, the first of which primarily acts in a direction perpendicular to the surface of said workpiece being ground, while the second of which primarily acts in a transverse direction perpendicular to the axis of reciprocating movement of said manipulator car and parallel to the surface being ground, each of said actuators having a cylinder divided into a pair of chambers by a piston, said pistons being at least indirectly coupled to said grinding wheel support;

a reciprocating drive mechanism operatively coupled to said manipulator car to move said car back and forth adjacent said grinding wheel;

a grinding wheel control system including a sensor sensing at least one operating parameter of said grinder, and a control circuit receiving the output of said sensor and comparing it to a predetermined value to derive a grinding control signal;

a manipulator car control system operatively associated with said reciprocating drive mechanism;

a first servo valve receiving the grinding control signal of said grinding wheel control system, said servo valve having at least one fluid port communicating with said first hydraulic actuator; a position sensor measuring the transverse position of said grinding wheel and generating a position signal indicative thereof;

an error signal generator producing a position error signal indicative of the deviation of said position signal from a position command signal;

first and second pressure sensors operatively associated with said hydraulic actuator, said pressure sensors generating pressure feedback signals indicative of the pressures in the respective chambers of said actuator;

an index control signal generator receiving a signal derived from said position error signal and a signal derived from said pressure feedback signal, said index control signal generator including a calculating device that determines the difference between said pressure feedback signals to generate a force signal indicative of the force exerted by said actuator in the direction of said desired position and generates an index control signal corresponding to said error signal less said force signal; and a second servo valve having an electrical control input receiving said index control signal, said valve having a fluid port communicating with at least one chamber of said actuator to cause hydraulic fluid to selectively flow into and out of the chambers of said second actuator responsive to said index control signal, thereby transversely moving said grinding wheel.

16. The conditioning grinder of claim 15 wherein said index control signal generator further includes an integrator integrating a signal having the same polarity as said position error signal to generate a pressure command signal, said pressure command signal being applied to said calculating device, said calculating device adding said pressure command signal to said position error signal, thereby compensating for forces exerted on said actuator during steady-state conditions.

17. The conditioning grinder of claim 16 wherein said integrator integrates only when enabled by an enable signal, said calculating device further including a threshold comparator having an output connected to said integrator and at least one input connected to said error signal generator to receive said position error signal, said threshold comparator generating said enable signal at its output when the absolute value of the error signal applied to its input exceeds a predetermined value.

18. The conditioner grinder of claim 15, further including an amplifier having an input connected to said error generator to receive said position error signal, and an output connected to said control signal generator, said amplifier having sufficient gain to make said control system unstable but for said pressure feedback signals.

19. The conditioner grinder of claim 15 wherein a rod extends from the piston of said actuator through one of said chambers, and wherein said system further includes an amplitude scaling device having an input connected to the output of one of said pressure sensors and an output connected to said control signal generator, said scaling device adjusting the amplitude of one pressure feedback signal to compensate for the area of said piston occupied by said rod.

20. The conditioner grinder of claim 19 wherein said scaling device is an amplifier having its input connected to the output of said pressure sensor for the chamber through which said rod extends, said amplifier having a gain determined by the ratio of the cross-sectional area of said piston to the difference between the cross-sectional area of said piston and the cross-sectional area of said rod at the point where it connects to said piston.

21. The conditioner grinder claim 15 wherein the ratio of the force generated by said actuator to said position error signal is sufficiently large to make said system unstable without said first and second pressure indications.

* * * * *